United States Patent [19]

Ushiro et al.

[11] Patent Number: 4,902,924

[45] Date of Patent: Feb. 20, 1990

[54] BRUSHLESS MOTOR

[75] Inventors: Tatsuzo Ushiro, Kawaguchi; Yukuo Karube, Yokohama, both of Japan

[73] Assignees: Canon Kabushiki Kaisha; Canon Seiki Kabushiki Kaisha, both of Tokyo, Japan

[21] Appl. No.: 133,782

[22] Filed: Dec. 16, 1987

[30] Foreign Application Priority Data

Dec. 19, 1986 [JP] Japan ................... 61-301512
Dec. 19, 1986 [JP] Japan ................... 61-301513
Jan. 13, 1987 [JP] Japan ................... 62-5811

[51] Int. Cl.⁴ .............................................. H02K 1/22
[52] U.S. Cl. ................................ 310/268; 310/156; 310/179; 310/258
[58] Field of Search ........... 310/268, 156, 46, 179, 310/180, 68 R, 68 B, 49 R, 254, 258, 162–165; 318/254

[56] References Cited

U.S. PATENT DOCUMENTS

| | | | |
|---|---|---|---|
| 3,407,320 | 10/1968 | McLean | 310/180 |
| 3,496,393 | 2/1970 | Reifman et al. | 310/49 |
| 3,504,253 | 3/1970 | Kavanaugh | 318/138 |
| 3,549,918 | 12/1970 | Hendrik Croymans et al. | 310/49 |
| 3,790,834 | 2/1974 | Tanaka | 310/162 |
| 4,130,769 | 12/1978 | Karube | 310/46 |
| 4,181,867 | 1/1980 | Muller | 310/268 |
| 4,260,920 | 4/1981 | Nakamura et al. | 310/156 |
| 4,599,561 | 7/1986 | Takahashi et al. | 324/208 |
| 4,656,381 | 4/1987 | Komatsu | 310/257 |
| 4,703,235 | 10/1987 | Wisner | 318/254 |

FOREIGN PATENT DOCUMENTS 45712 4/1979 Japan .
22574 2/1983 Japan .
46633 10/1985 Japan .

OTHER PUBLICATIONS

Nobuyoshi Yokobori, Minoru Koda and Kazumi Iwasaki, "Direct-Drive Capstan Motor for VHS VTRs", National Technical Report, vol. 28, No. 3, Jun. 1982.

*Primary Examiner*—R. Skudy
*Attorney, Agent, or Firm*—Fitzpatrick, Cella, Harper & Scinto

[57] ABSTRACT

A brushless motor includes a rotor having a multipolar magnet with n-number of magnetic poles and a stator yoke having a plurality of field coils disposed at a position opposing the multipolar magnet. The stator yoke of the brushless motor is provided with a magnetic-resistance varying portion to improve the smoothness of rotation of the rotor.

1 Claim, 9 Drawing Sheets

BRUSHLESS MOTOR

BACKGROUND OF THE INVENTION

1. Field of the Invention

The present invention relates generally to brushless motors and, more specifically, to a flat type brushless motor of the type that includes a plurality of spiral coils disposed on a stator yoke; a permanent magnet disposed on a rotor at a position thereof opposing the spiral coils; and a detecting device for detecting the phase of rotation of the rotor so that an electric current is supplied to the coils while being sequentially switched over therebetween at a predetermined timing, thereby generating drive torque.

2. Related Background Art

Figure 1:
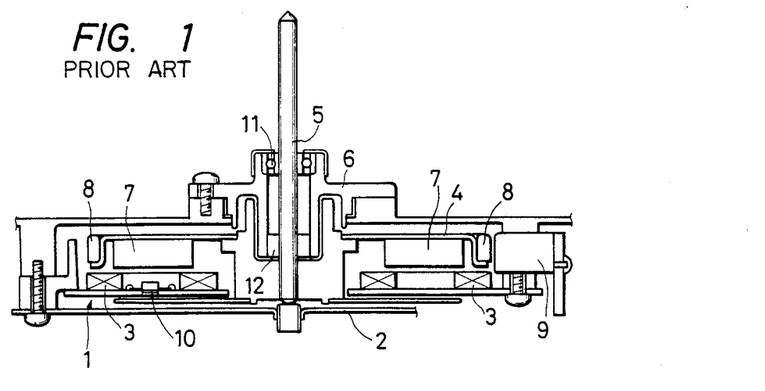
FIG. 1 is a diagrammatic view, partially in cross section, of the construction of a typical example of a brushless motor of the related art.

A capstan motor which is commonly used with a magnetic recording/reproducing apparatus or the like is illustrated in FIG. 1 as one typical example of a conventional type of brushless motor. A stator yoke 1 is attached to a housing 2, and a plurality of spiral coils 3 are disposed on the stator yoke 1 around the circumference thereof. A rotor yoke 4 is supported via a bush 6 on a rotating shaft 5, and a multipolar magnet 7 is attached to the rotor yoke 4 at the position thereof opposing the spiral coils 3. An FG magnet 8 which is magnetized at a fine pitch is disposed around the outer periphery of the rotor yoke 4, and a magnetism detecting device 9 is attached to the stator yoke 1. In general, the magnetism detecting device 9 is constituted by a semiconductor magnetic resistance device for detecting variations in magnetic resistance. The magnetism detecting device 9 detects the state of rotation of the rotating shaft 5 from variations in the magnetic field caused by the magnet 8.

A Hall element 10 is fixed to the stator yoke 1, and the Hall element 10 can be used to detect the phase of the multipolar magnet 7 while the rotor yoke 4 is rotating about the axis of the shaft 5.

A ball bearing 11 and a metal bearing 12 cooperate with each other to support the rotating shaft 5 for rotation about its axis with respect to the housing 2.

In the brushless motor having the above-described construction, torque is produced by supplying an electric current to the coils 3 while the current is sequentially being switched over among the coils 3 at a predetermined timing based on the output of the Hall element 10, thereby driving the rotor yoke 4. In a case where such a motor has three phases, a composite torque is produced in a manner such as that shown in FIG. 2.

Figure 2A:
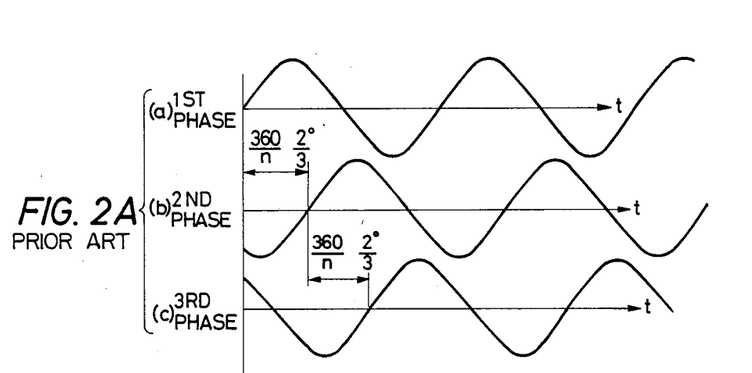
FIGS. 2A, 2B and 2C are graphs illustrating the torque ripples of the brushless motor of the related art.
Figure 2B:
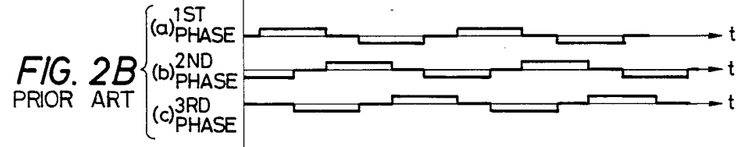
Figure 2C:
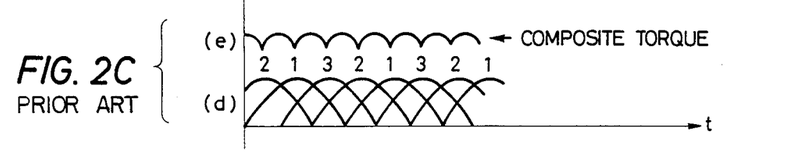

More specifically, if n represents the number of magnetic poles of the multipolar magnet 7, the distributions of magnetic flux density in the coils of the respective three phases varies in the form of sine waves, with (a) a first phase, (b) a second phase, and (c) a third phase shifted one from another as shown in FIG. 2A, since the coils 3 corresponding to the respective three phases are disposed on the stator yoke 1, and are the coils 3 out of phase with respect to the magnetic poles by an electric angle of 120°. A current is sequentially supplied to the coils 3 of the three phases in the positive and negative directions at the timing shown by wave forms a, b, and c in FIG. 2B. Therefore, torque is generated in correspondence with each individual phase as shown in a wave form d of FIG. 2C, and the resultant composite torque assumes a wave form e in FIG. 2C. Thus torque ripples are formed.

Such torque ripples cause non-uniform revolution. If T represents the magnitude of the torque ripples, N the rotational speed of the rotating shaft 5, J the inertia force, and $\Delta N$ the degree of non-uniformity of rotation, the relationship represented by the following expression is established:

$$\Delta N \alpha \frac{T}{N^2 \cdot J} \quad (1)$$

Therefore, in particular, use of a capstan whose rotational speed N is low increases the degree of non-uniform rotation $\Delta N$ due to the torque ripple T. This results in a problem in that magnetic recording/reproducing apparatus will experience wow and flutter at low frequencies as in sound signals and jitters as in video signals. To cope with this problem, inertia force has in the past been increased. However, adoption of this measure is retrogression in relation to the desirable tendency to seek a reduction in the total weight of the apparatus.

SUMMARY OF THE INVENTION

It is therefore a first object of the present invention to provide a motor in which it is possible to reduce the aforementioned torque ripples.

It is a second object of the present invention to provide a brushless motor having a construction such as that described illustratively in the related art in which motor a magnet and field coils are respectively disposed on a rotor yoke and a stator yoke in a flat manner and in face-to-face relationship with each other, the yoke for forming a magnetic circuit for magnetic flux being provided with a construction for generating cogging torque which acts to compensate for torque ripples.

It is a third object of the present invention to provide a flat-type brushless motor having a magnetic-resistance varying portion formed in a yoke member for generation of cogging torque.

A first feature of the present invention resides in a three-phase brushless motor comprising a rotor yoke having a multipolar magnet with n-number of magnetic poles; a stator yoke arranged to cause the rotor yoke to rotate about its axis; and at least three ridges disposed on the surface of the stator yoke which opposes the multipolar magnet and around the circumference of the stator yoke at a pitch equivalent to an electric angle of 60°.

A second feature of the present invention resided in a three-phase brushless motor comprising a rotor yoke having a multipolar magnet with n-number of magnetic poles; a stator yoke arranged to cause the rotor yoke to rotate about its axis; and at least three holes formed in the surface of the stator yoke which opposes the multipolar magnet, the at least three holes being coaxial with the circumference of the stator yoke and being disposed at a pitch equivalent to an electric angle of 60°.

A third feature of the present invention resides in a brushless motor comprising a rotor having a permanent magnet magnetized alternately in N and S polarities around the circumference thereof; a plurality of armature coils disposed in face-to-face relationship with the permanent magnet in a number which corresponds to the number of phases; an armature yoke for fixedly supporting the armature coils; and a magnetic-resistance varying portion for generating a cogging-torque wave form which is of a phase opposite to that of the wave form of torque ripples generated by the brushless motor.

These and other objects will become apparent from the following description taken in conjunction with the accompanying drawings.

BRIEF DESCRIPTION OF THE DRAWINGS

FIGS. 16(a), 16(b), 16(c), and 16(d) are schematic views illustrating a manner in which cogging torque in generated in the third embodiment of the invention;

DESCRIPTION OF THE PREFERRED EMBODIMENTS

Embodiment 1

Preferred embodiments of the present invention will be described in detail below with reference to the accompanying drawings.

FIGS. 3A through 7B illustrate a first preferred embodiment of the present invention.

Figure 3A:
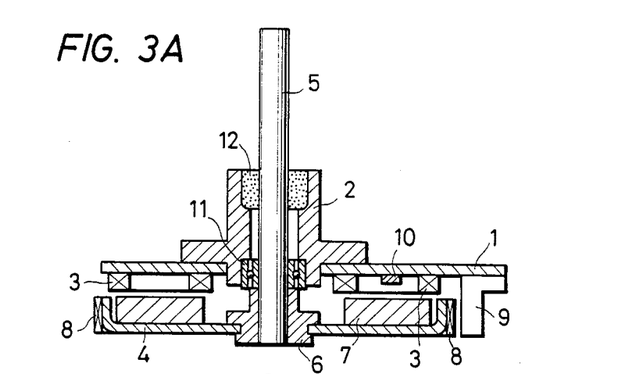
FIG. 3A is a diagrammatic cross section of the essential portion of a first preferred embodiment of the motor of the present invention.

FIG. 3A illustrates in cross section the essential portion of a brushless motor to which the invention is applied. The structure of the motor shown in FIG. 3A is a simplified one of that shown in FIG. 1, and therefore the description thereof is omitted.

Figure 3B:
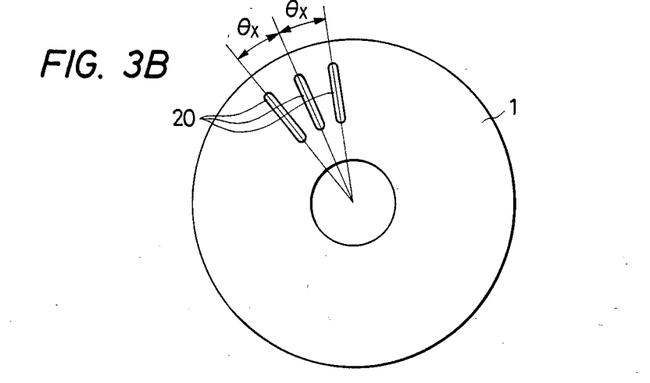
FIG. 3B is a diagrammatic illustration of one example of the construction of the brushless motor of the invention, and illustrates the arrangement of ridges formed on the stator yoke of the motor.
Figure 3C:
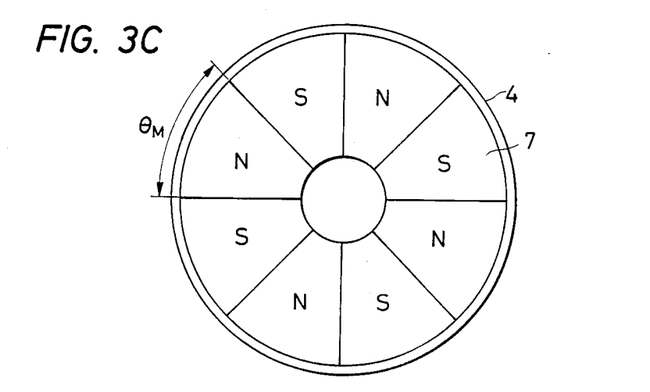
FIG. 3C is a view similar to FIG. 3B, illustrating the arrangement of the magnetic poles of the multipolar magnet provided on the rotor yoke of the motor.

FIGS. 3B and 3C illustrate the stator yoke 1 and the multipolar magnet 7 attached to the rotor yoke 4, respectively, but neither the spiral coils 3 on the stator yoke 1 nor the details of the rotor yoke 4 are shown for the sake of simplicity. By way of example, the multipolar magnet 7 has eight magnetic poles.

In the first embodiment, three ridges 20 are disposed radially on the side of the stator yoke opposing the multipolar magnet 7. The three ridges 20 are spaced apart from each other at the circumference of the stator yoke 1 at intervals equivalent to a predetermined mechanical phase angle (an electric angle of 60°). More specifically, if n represents the number of poles of the multipolar magnet 7 (in this embodiment n=8), the pitch angle $\theta_M$ of the multipolar magnet 7 is $360°/n = 45°$ and the pitch angle $\theta_x$ of the ridges 20 is $\frac{1}{3}\theta_M$.

Figure 4:
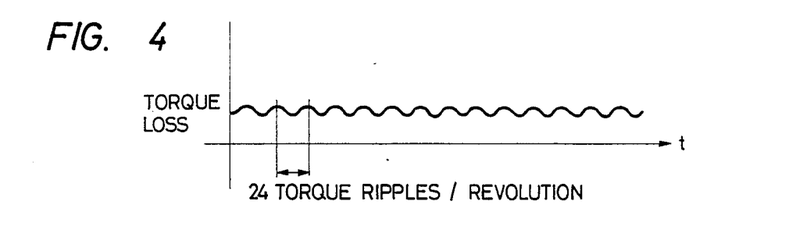
FIG. 4 is a wave-form chart illustrating one example of the wave form of torque loss which is generated in the brushless motor of the invention.

In the first embodiment in which the three ridges 20 are disposed at intervals equivalent to the pitch angle of $$\theta_x = \frac{1}{3} \cdot \theta_M = \frac{360°}{n} \times \frac{1}{3},$$

during the revolution of the rotor yoke 4 about its axis, each time one of poles of the multipolar magnet 7 moves past the area in which the ridges 20 face the magnet 7, the magnetic flux varies at each of the ridges 20 and thus cogging torque is generated. This variation in the magnetic flux is generated in correspondence with the position of each of the poles of the magnet 7. Therefore, as shown in FIG. 4, the number of variations in torque, that is, the number of torque ripples generated in each revolution of the rotor yoke 4 is:

$$\frac{360°}{\theta_x} = n \times 3 = 24.$$

Figure 5A:
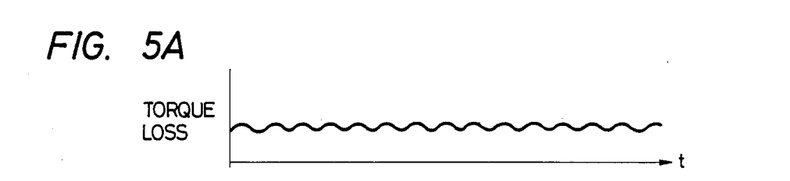
FIGS. 5A, 5B and 5C are wave-form charts illustrating the process of using the torque loss obtained from the brushless motor of the invention to eliminate torque generated.
Figure 5B:
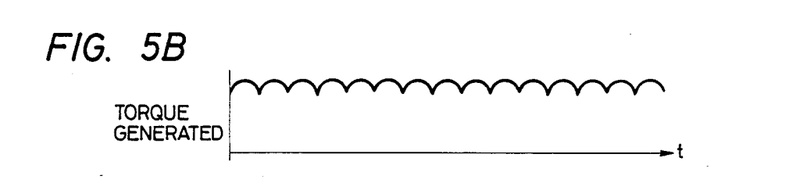
Figure 5C:
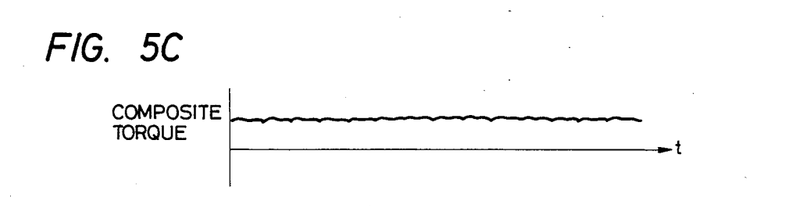

In general, in brushless motors of this type that incorporate a multipolar magnet having n-number of poles, (n×3)-number of torque ripples are generated. In this embodiment, however, since the three ridges 20 are disposed at equal intervals at the pitch angle of $$\frac{360°}{n \times 3},$$

it is possible to generate cogging torque multiplied by the number equivalent to the number of torque ripples generated. This cogging torque is made to act upon the rotor yoke 4 as torque loss such as that shown in FIG. 5A, to compensate for the torque generated shown in FIG. 5B, thereby providing a composite torque such as that shown in FIG. 5C.

Figure 6:
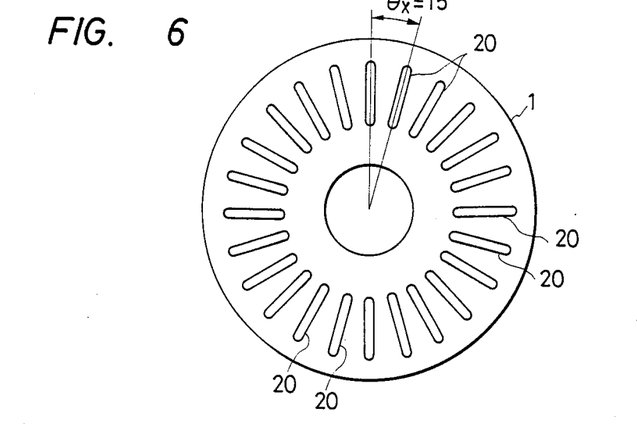
FIG. 6 is a diagrammatic illustration of the construction of a stator yoke constituted by one modified form of the first embodiment of the invention.

FIG. 6 illustrates one modified form of the first preferred embodiment of the present invention. In this modified form, the ridges 20 are disposed around the whole circumference at the pitch angle of $\theta_x = 15°$ which is the same as that shown in FIG. 3B. In this modified form, since the ridges 20 are disposed at the pitch angle of $$\frac{360°}{n \times 3},$$

clogging torque such as that described above can be generated in correspondence with n-number of poles, and at the same time. It is accordingly possible to make uniform the deviations between the crests and roots of wave forms which are derived from any error in the pitch angle, thereby further effectively eliminating torque ripples.

Figure 7A:
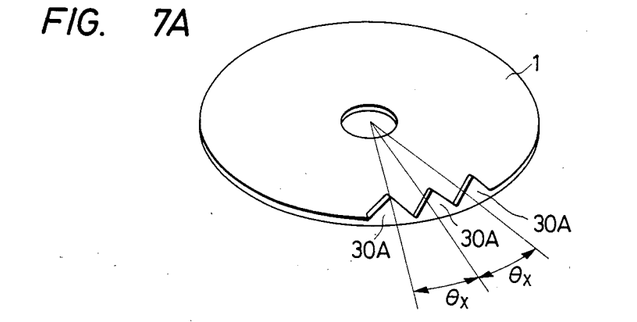
FIG. 7A is a diagrammatic illustration of another modified form of the first embodiment of the present invention.

FIG. 7A illustrates another modified form of the first embodiment of the present invention. In this modified form, saw-toothed extensions 30A are formed at a portion of the circumference of the stator yoke 1 on the side thereof opposing the rotor yoke (not shown in FIG. 7A). In this modified form as well, if the number n of poles is 8, the pitch angle $\theta_x$ at which the sawtoothed extensions 30A are disposed is 15°.

Figure 7B:
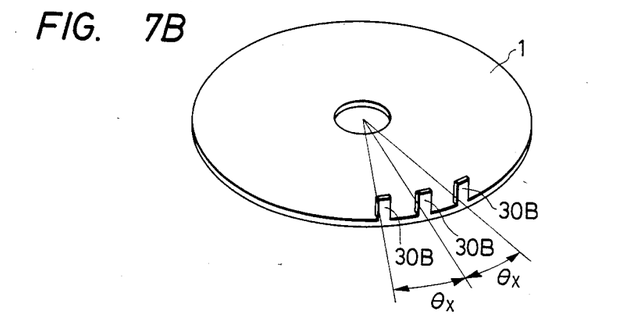
FIG. 7B is a diagrammatic illustration of yet another modified form of the first embodiment of the present invention.

FIG. 7B illustrates yet another modified form in which comb-toothed extensions 30B are formed at a portion of the circumference of the stator yoke 1 at a pitch angle of 15° in a similar manner to that of the modification shown in FIG. 7B. In each of these modifications, it is preferable that the number of extensions 30A or 30B be three or more. The extensions may be disposed around a part or the whole of the circumference of the stator yoke 1. As a matter of course, as shown in FIGS. 7A and 7B, a plurality of extensions equivalent in number to a multiple of 3 may be provided around a part or the whole of the circumference of the stator yoke 1.

All of the above-described embodiments and modifications refer to the instance where, for the purpose of illustration, the pitch angle $\theta_x$ is $$\frac{360°}{n \times 3}.$$

Although not shown specifically, if the number of poles is likewise 8, a similar effect may also be accomplished by forming a plurality of ridges or extensions such as the above-described ones equivalent in number to at least three or a multiple of 3 at a pitch angle $\theta_x$ of 30°, 60° or 120° (equivalent to an electric angle of 60°). Thus, in an instance where the pitch angle $\theta_x$ is selected to be $(15 \times 2^3)°$, three ridges or extensions are disposed, although not shown, with an equally spaced apart relationship around the entire circumference.

As described above, in the first embodiment of the invention, at least three ridges or extensions are formed on the side of the stator yoke opposing the rotor yoke at a pitch equivalent to an electric phase angle of 60° with respect to the multipolar magnet having n-number of poles. Accordingly, each time one of the poles of the multipolar magnet moves past the position at which one of the ridges or extensions is located, cogging torque is generated. The number of generation of the cogging torque is always n×3 in each revolution of the stator yoke. Accordingly, the torque ripples can be eliminated by combining the torque ripples generated by the motor with the cogging torque as torque loss.

Embodiment 2

Figure 8:
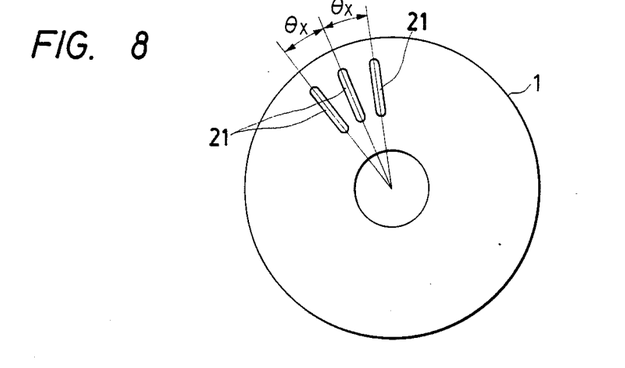
FIG. 8 is a diagrammatic illustration of a second preferred embodiment of the present, showing the arrangement of slots formed in the stator yoke of the motor.

A second preferred embodiment of the present invention will be described below with reference to FIGS. 8 to 10 in which like reference numerals are used to denote like or corresponding portions relative to those of the first embodiment.

In the second embodiment, three slots 21 are disposed radially in the stator yoke 1. The three slots 21 are spaced apart along from each other at the circumference of the stator yoke 1 at intervals equivalent to an electric phase angle (an electric angle of 60°). More specifically, if n represents the number of poles of the multipolar magnet 7 (in this embodiment n=8), the pitch angle $\theta_M$ of the multipolar magnet 7 is $360°/n = 45°$ and the pitch angle $\theta_x$ of the slots 21 is $\frac{1}{3}\theta_M$.

In the second embodiment in which the three slots 21 are disposed at intervals equivalent to the pitch angle of $$\theta_x = \frac{1}{3} \cdot \theta_M = \frac{360°}{n} \times \frac{1}{3},$$

each time, during the revolution of the rotor yoke 4, one of the poles of the multipolar polar magnet 7 moves past the area in which the slots 21 are formed, the magnetic flux varies at each of the slots 21 and thus cogging torque is generated. This variation in the magnetic flux is generated in correspondence with the position of each of the poles of the magnet 7. Therefore, as shown in FIG. 4, the number of variations in torque, that is, the number of torque ripples generated in each revolution of the rotor yoke 4 is:

$$\frac{360°}{\theta_x} = n \times 3 = 24.$$

In general, in brushless motors of this type that incorporate a multipolar magnet having n-number of poles, (n×3)-number of torque ripples are generated. In this embodiment, however, since the three slots 21 are formed at equal intervals at the pitch angle of $$\frac{360°}{n \times 3},$$

it is possible to generate cogging torque multiplied by the number equivalent to the number of torque ripples generated. This cogging torque is made to act upon the rotor yoke 4 as torque loss such as that shown in FIG. 5A, to compensate for the torque generated shown in FIG. 5B, thereby providing a composite torque such as that shown in FIG. 5C.

Figure 9:
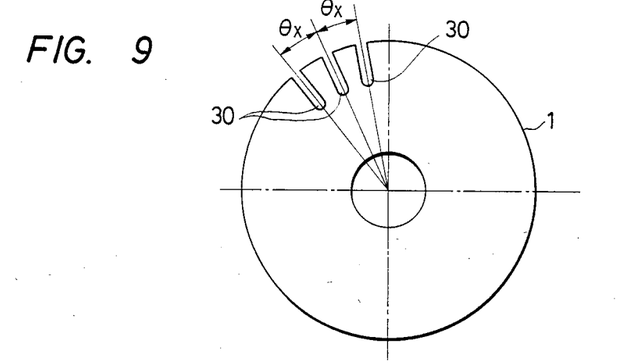
FIG. 9 is a view similar to FIG. 8, illustrating the arrangement of cutouts formed in the stator yoke of the motor.

FIG. 9 illustrates one modified form of the second preferred embodiment of the present invention. In this modified form, cutouts 30 extend radially inwardly from a portion of the circumference of the stator yoke 1 and are spaced apart from each other at that circumference at an pitch angle of $\theta_x = 15°$ which is the same as that shown in FIG. 8. In this modified form, since the cutouts 30 are formed at the pitch angle of $$\frac{360°}{n \times 3},$$

cogging torque such as that described above can be generated in correspondence with n-number of poles, and at the same time. It is accordingly possible to make uniform the deviations between the crests and roots of wave forms which are derived from any error in the pitch angle, thereby further effectively eliminating torque ripples.

Figure 10:
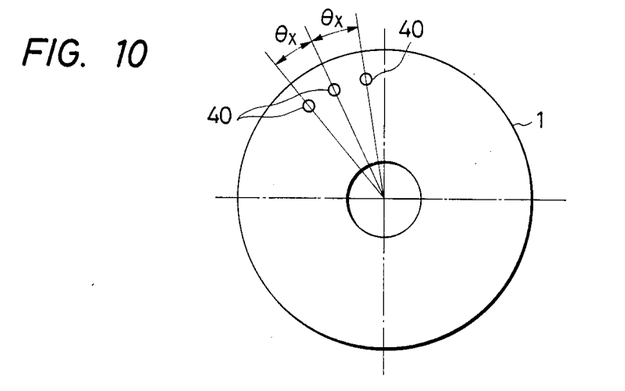
FIG. 10 is a view similar to FIG. 8, illustrating the arrangement of circular holes formed in the stator yoke of the motor.

FIG. 10 illustrates another modified form of the second embodiment of the present invention. In this modified form, circular holes 40 are formed in a portion coaxial with the circumference of the stator yoke 1 at the pitch angle of $\theta_x=15°$. In each of these modifications, it is preferable that the number of cutouts 30 or circular holes 40 be three or more. In addition, the cutouts or holes may be formed around a part or the whole of the circumference of the stator yoke 1. As a matter of course, as shown in FIGS. 9 and 10, the cutouts or holes equivalent in number to a multiple of 3 may be provided around a part or the whole of the circumference of the stator yoke 1.

All of the second embodiment and modifications refer to the instance where, for the purpose of illustration, the pitch angle $\theta_x$ is $$\frac{360°}{n \times 3}.$$

Although not shown, if the number of poles is likewise 8, a similar effect may also be accomplished by forming the cutouts 30 or the holes 40 equivalent in number to at least three or a multiple of 3 at a pitch angle $\theta_x$ of 30°, 60° or 120° (equivalent to an electric angle of 60°). Thus, in an instance where the pitch angle $\theta_x$ is selected to be $(15 \times 2^3)°$, three cutouts or holes are disposed, although not shown, with an equally spaced apart relationship around the entire circumference.

The above description, for the purpose of illustration, refers to the formation of the slots, the circular holes, and the cutouts. However, they are of course not confined solely to the forms illustrated in this embodiment.

As described above, in the second embodiment, at least three cutouts or holes are formed in the stator yoke in face-to-face relationship with the rotor yoke, at a pitch equivalent to an electric phase angle of 60° with respect to the multipolar magnet having n-number of poles. Accordingly, each time one of the poles of the multipolar magnet moves past the position at which each of the cutouts or holes is located, cogging torque is generated. The number of generation of the cogging torque is always n×3 in each revolution of the stator yoke. Accordingly, the torque ripples generated can be eliminated by utilizing the cogging torque as torque loss.

FIGS. 11 through 20 illustrate a third preferred embodiment of the present invention.

Figure 11:
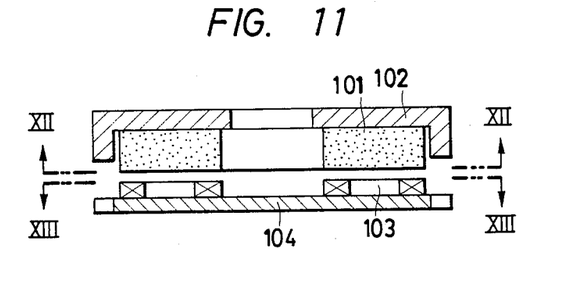
FIG. 11 is a diagrammatic cross sectional front elevation of the essential portion of a third preferred embodiment of the present invention.
Figure 12:
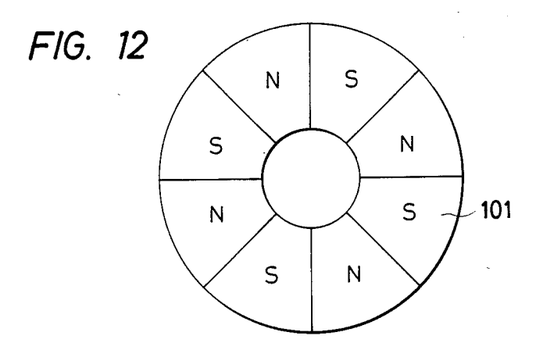
FIG. 12 is a cross section taken along the line XII—XII of FIG. 11.
Figure 13:
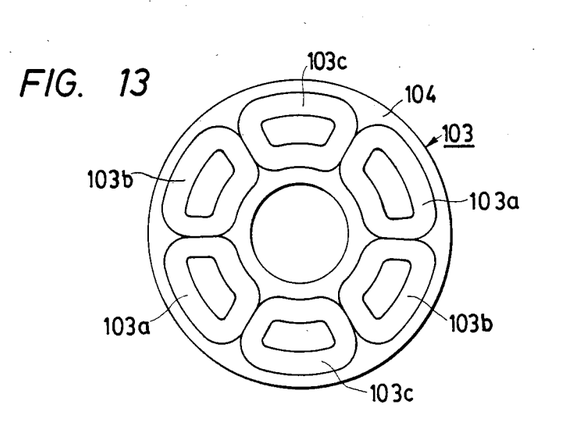
FIG. 13 is a cross section taken along the line XIII—XIII of FIG. 11.

FIG. 11 is a diagrammatic cross section illustrating the third embodiment of the invention, FIG. 12 is a cross section taken along the line XII—XII of FIG. 11, and FIG. 13 is a cross section taken along the line XIII—XIII of FIG. 11. The third embodiment relates to a coreless flat brushless motor.

A rotor assembly includes a disk-like rotor yoke 102 which forms a return circuit for magnetic flux and is rotatably supported by a combination of a shaft and a bearing (neither of which are shown); and a field permanent magnet 101 attached to the surface of the rotor yoke 102 opposing a stator assembly and having a plurality of magnetic poles. The poles are radially formed in such a manner that the polarity of each of the poles is adjacent to a polarity opposite thereto.

The stator assembly includes a plurality of armature coils 103 disposed in face-to-face relationship with the field permanent magnet 101, with a predetermined spacing defined between the coils 103 and the magnet 101; and an armature yoke 104 for fixedly supporting the armature coils 103.

As shown in FIGS. 12 and 13, the third embodiment has the structure of a three-phase flat brushless motor having six coils and hence eight poles. A three-phase armature is constituted by coil group 103a, 103b, and 103c each including a pair of the armature coils 103.

Figure 14:
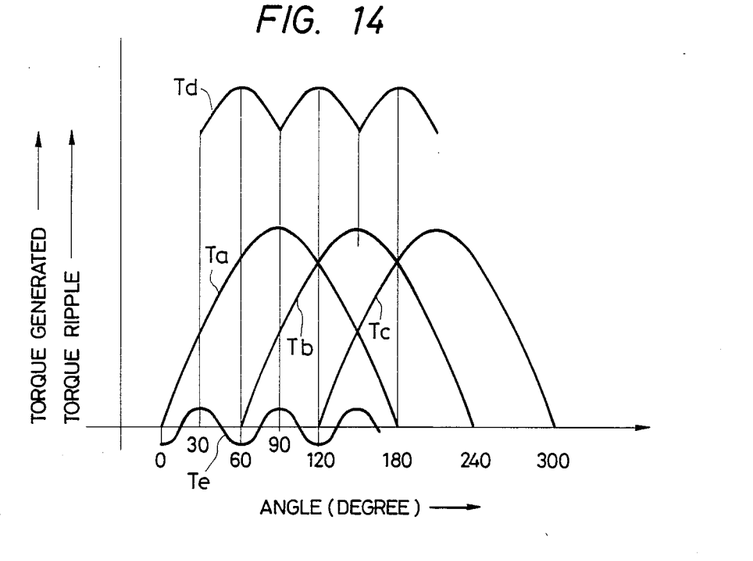
FIG. 14 is a graph showing torque generated in the third embodiment.

In the above arrangement, the coil groups 103a, 103b, and 103c of the armature coils 103 are sequentially energized with a phase difference equivalent to an electric angle of 60° by energization means (not shown). Thus, a rotating magnetic field is generated so that the rotor is caused to revolve by the force of repulsion produced between this magnetic field and each of the magnetic poles of the field permanent magnet 101. In this case, torque is generated as shown in FIG. 14 between the field permanent magnet 101 and each of the armature-coil groups 103a, 103b and 103c. In the case of energization in opposite directions at an angle of 120°, each generated torque Ta, Tb, and Tc has a pseudo-sine wave form showing a phase difference equivalent to an electric angle of 60°. Therefore, from the viewpoint of the entire motor, the composite torque acting between the armature coils 103 and the field permanent magnet 101 has a wave form (a wave form T/d in FIG. 14) in which torque wave forms equivalent to two phases are added. The composite torque exhibits its minimum value at the angular position at which the torque wave form of each phase reach the maximum value.

A wave form Te in FIG. 14 is a cogging torque wave form used to compensate for the torque ripples of the composite torque Td. As is evident from FIG. 14, the cogging torque Te reaches its maximum minus value at each angular position at which the composite torque Td reaches the maximum value while, at each angular position at which the composite torque Td reaches its minimum value, the cogging torque Te reaches the maximum plus value. It is thus possible to compensate for the ripples of the torque generated.

Figure 15:
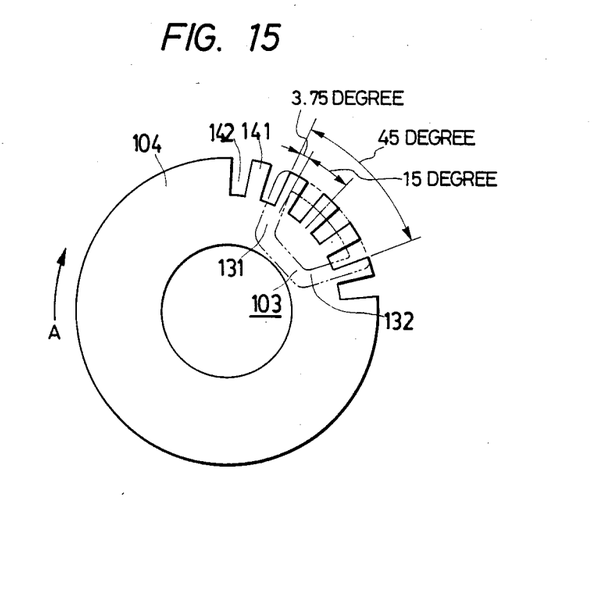
FIG. 15 is a plan view of one example of an armature yoke to which the third embodiment of the invention pertains.

In order to generate this cogging torque, as shown in FIG. 15, slit-like recesses 142 are partially formed at predetermined intervals around the outer circumference of the armature yoke 104, thereby forming a portion adapted to vary magnetic resistance (the width of each raised portion 141 is equal to that of each slit-like recess 142). The pitch angle between adjacent ones of the raised portions 141 is selected to be, for example, 15 degrees, and the angle between the axes of opposite sides 131 and 132 of each of the armature coils 103 is selected to be, for example, 45 degrees. Specifically, the angle of 45° between the sides 131 and 132 corresponds to an electric angle of 180°. Therefore, the pitch of the slit-like recesses 142 corresponds to an electric angle of 60°. Incidentally, the raised portions 141 serve as a lowmagnetism resisting portion and the slit-like recesses 142 serve as a high-magnetism resisting portion.

In FIG. 15, if the direction of rotor revolution is represented by an arrow A, a shift equivalent to an electric angle of 15° is formed between the axes of each raised portion 141 and the sides 131, 132, that is, a 3.75° phase shift is formed in terms of a mechanical angle.

Figure 16A:
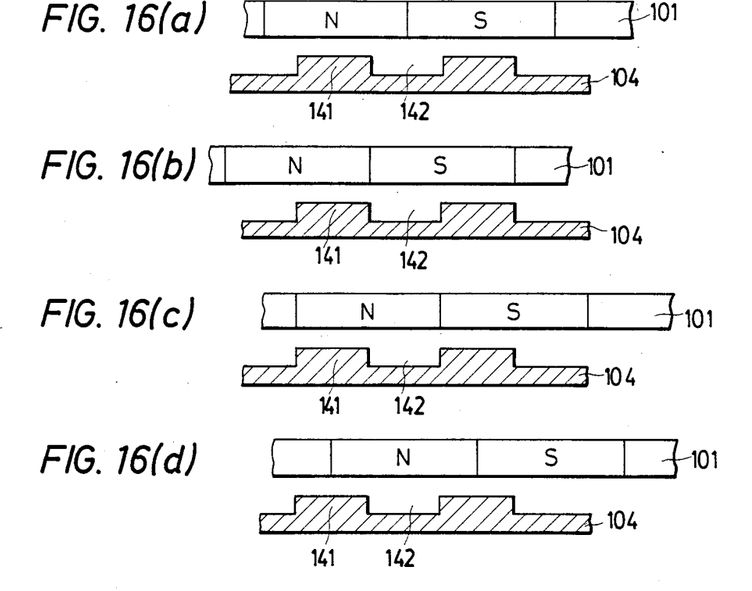

The manner in which cogging torque is generated is described below with reference to FIGS. 16A to 16D. FIG. 16A illustrates a case where each of the raised portions 141 is located at a position opposing the center of each magnetic pole of the field permanent magnet 101, that is, FIG. 16A illustrates a magnetically stable state wherein cogging torque is zero. In the state shown in FIG. 18A, when the relative position between the field permanent magnet 101 and the raised portions 141 shifts leftwardly or rightwardly, cogging torque acting to return the relative position to the state shown in FIG. 16A is generated.

FIG. 16B illustrates a positional relationship in which the cogging torque acts leftwardly. FIG. 16D illustrates a case where the cogging torque is zero, that is, a magnetically unstable state.

Figure 17:
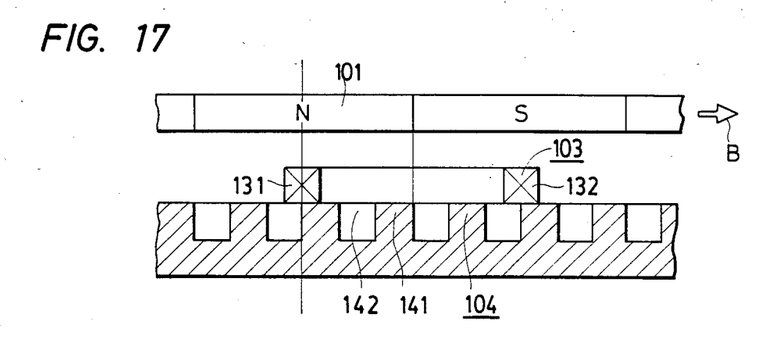
FIG. 17 is a schematic views illustrating a manner in which cogging torque is used to compensate for torque ripples in the third embodiment of the invention.

FIG. 17 is a view illustrating the principle of a compensation operation in which torque ripples are compensated for by cogging torque. The field permanent magnet 101 is magnetized alternatively in S and N polarities and, for example, when the side 131 opposes the center of N polarity, the side 132 opposes the center of S polarity. When the armature coils 103 are energized at this position, the torque acting between the armature coils 103 and the field permanent magnet 101 reaches its maximum value which corresponds to the position of an electric angle of 90° in FIG. 14. Since the composite torque reaches its minimum value at this position, it is necessary that the cogging torque assume its maximum plus value.

If the rotor moves in the direction indicated by an arrow B of FIG. 17, all that is required in the state illustrated in this Figure to generate cogging torque which causes the field permanent magnet 101 to move in the direction of the arrow B. Therefore, in order to achieve the objects of the present invention, the raised portions 141 of the armature yoke 104 are formed sequentially in such a manner that the phase of the electric angle is shifted by 15 degrees from the center of the width between the opposite sides 131 and 132 of each coil 103 in the direction of rotor rotation.

In the state shown in FIG. 17, when the rotor moves through an electric angle of 30°, the composite torque reaches the maximum value (corresponding to the position of the electric angle of 120° in FIG. 14). At this position, the cogging torque needs to reach the maximum value in the direction opposite to that of the arrow B. Therefore, the width of each of the raised portions 141 of the armature yoke 4 is selected to a size corresponding to an electric angle of 60°. In this case, the raised portions 141 having a width equivalent to an electric angle of 30° are formed around the outer circumference of the armature yoke 104 at a pitch corresponding to an electric angle of 60°, whereby the composite torque ripples can be compensated for by the cogging torque. In principle, no torque loss occurs since the cogging torque is generated alternately in the plus and minus directions.

In FIG. 15, by way of example, the raised portions 141 are formed around a portion of the outer circumference of the armature yoke 104. However, it is preferred that the raised portions 141 be formed around the entire circumference of the armature yoke 104. In addition, it is preferred that the radial length of each of the slit-like recesses 142 be determined in accordance with the magnitude of torque ripples to be compensated for.

Figure 18:
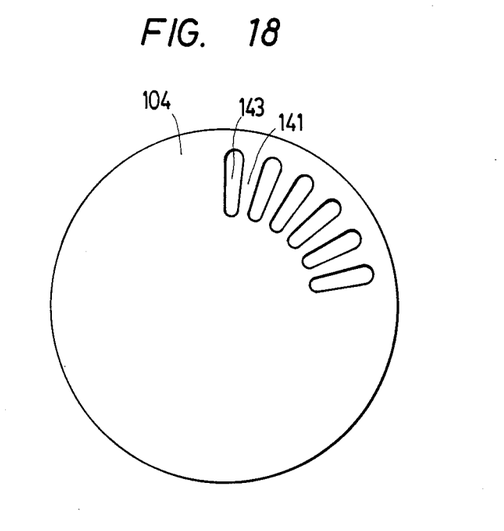
FIG. 18 is a plan view of another example of the armature yoke in the third embodiment of the invention.
Figure 19:
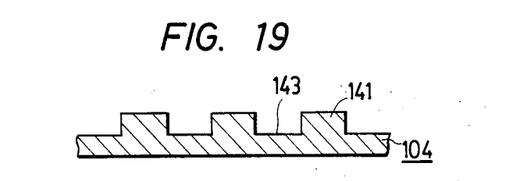
FIG. 19 is a diagrammatic cross section of one example of a magnetic-resistance varying portion in the third embodiment of the invention.
Figure 20:
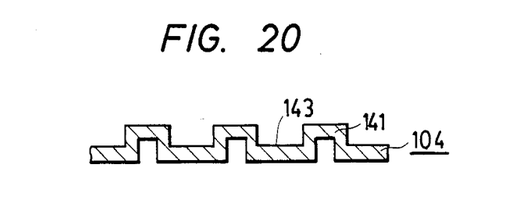
FIG. 20 is a diagrammatic cross section of another example of the magnetic-resistance varying portion in the third embodiment of the invention.

FIG. 18 illustrates another example of the raised portions 141. The raised portions 141 may be radially formed around the circumference of the yoke 104 shown in FIG. 19, for example, by welding, or may be pressed as shown in FIG. 20. Incidentally, reference numeral 143 denotes a groove formed between the respective raised portions 141.

The preferred embodiments are described hereinabove with illustrative referece to a flat type brushless motor. However, it will be appreciated from the cross-sectional development of FIG. 17 that the present invention is applicable to a cylindrical brushless motor.

As described above, in accordance with the present invention, the armature yoke is provided with the magnetic-resistance varying portion for generating a cogging wave form which is of a phase opposite to that of a torque-ripple wave form. It is therefore possible to provide a brushless motor in which torque ripples can be reduced by a simple construction without the need to reduce the torque of the motor per se.

We claim:
1. A brushless motor comprising:
a motor shaft;
a rotor including a plate-like stator yoke member and a permanent magnet mounted thereon, the permanent magnet having plural north poles and plural south poles magnetized in an axial direction of said rotor and arranged along a circle around the axis of the rotor;
a stator including a plate-like yoke member and plural coils fixed on the stator yoke member and arranged along a circle around said axis and forming a small gap with the permanent magnet;
the stator yoke member being provided with three holes so that flux from the permanent magnet changes as the permanent magnet rotates from a position where a permanent magnet pole thereof passes over each of said holes to a position where the permanent magnet pole passes over a ridge portion of the stator yoke member located adjacent to such holes.

* * * * *

UNITED STATES PATENT AND TRADEMARK OFFICE
CERTIFICATE OF CORRECTION

PATENT NO. : 4,902,924

DATED : February 20, 1990

INVENTOR(S) : TATSUZO USHIRO ET AL.

It is certified that error appears in the above-identified patent and that said Letters Patent is hereby corrected as shown below:

ON THE TITLE PAGE,

AT [56] REFERENCES CITED

Foreign Patent Documents, "46633  10/1985 Japan" should read --46633  3/1985 Japan--.

COLUMN 2

Line 8, "$\Delta Na \dfrac{T}{N^2 \cdot J}$ (1)" should read --$\Delta N\alpha \dfrac{T}{N^2 \cdot J}$ (1)--.

Line 49, "resided" should read --resides--.

COLUMN 3

Line 40, "present," should read --present invention,--.
Line 49, "cross sectional" should read --cross-sectional--.
Line 62, "in" (second occurrence) should read --is--.
Line 64, "views" should read --view--.

COLUMN 5

Line 18, "clogging torque" should read --cogging torque--.
Line 37, "FIG. 7B." should read --FIG. 7A.--.

COLUMN 6

Line 68, "an" should read --a--.

UNITED STATES PATENT AND TRADEMARK OFFICE
CERTIFICATE OF CORRECTION

PATENT NO. : 4,902,924

DATED : February 20, 1990

INVENTOR(S) : TATSUZO USHIRO ET AL.

It is certified that error appears in the above-identified patent and that said Letters Patent is hereby corrected as shown below:

COLUMN 8

Line 40, "reach" should read --reaches--.
    Line 67, "lowmagnetism" should read --low-magnetism--.

COLUMN 9

Line 7, "FIGS. 16A to 16D." should read
            --FIGS. 16(a) to 16(d).--.
    Line 8, "FIG. 16A" should read --FIG. 16(a)--.
    Line 11, "FIG. 16A" should read --FIG. 16(a)--.
    Line 13, "FIG. 18A," should read
            --FIGS. 16(b) and 16(c),--.
    Line 17, "FIG. 16A" should read --FIG. 16(a)--.
    Line 18, "FIG. 16B" should read --FIG. 16(c)--.
    Line 19, "FIG. 16D" should read --FIG. 16(d)--.
    Line 25, "alternatively" should read --alternately--.
    Line 38, "Figure" should read --is--.

UNITED STATES PATENT AND TRADEMARK OFFICE
CERTIFICATE OF CORRECTION

PATENT NO. : 4,902,924

DATED : February 20, 1990

INVENTOR(S) : TATSUZO USHIRO ET AL.

It is certified that error appears in the above-identified patent and that said Letters Patent is hereby corrected as shown below:

COLUMN 10

Line 23, "referece" should read --reference--.
Line 39, "plate-like stator yoke member" should read --plate-like rotor yoke member--.
Line 45, "plate-like yoke member" should read --plate-like stator yoke member--.
Line 54, "ridge" should be deleted.

Signed and Sealed this

Fifth Day of May, 1992

*Attest:*

DOUGLAS B. COMER

*Attesting Officer*   Acting Commissioner of Patents and Trademarks